United States Patent [19]

Nakamura et al.

[11] Patent Number: 5,059,356

[45] Date of Patent: * Oct. 22, 1991

[54] POLARIZING FILM

[75] Inventors: Katsuji Nakamura, Yokohama; Junichi Fujio; Shin Hosonuma, both of Nagoya; Masakatsu Nakatsuka; Tsutomu Nishizawa, both of Yokohama, all of Japan

[73] Assignee: Mitsui Toatsu Chemicals, Incorporated, Tokyo, Japan

[ * ] Notice: The portion of the term of this patent subsequent to Apr. 25, 2006 has been disclaimed.

[21] Appl. No.: 579,246

[22] Filed: Sep. 6, 1990

Related U.S. Application Data

[60] Continuation of Ser. No. 308,031, Feb. 27, 1989, abandoned, which is a division of Ser. No. 866,492, filed as PCT JP85/00328 on Jun. 12, 1985, published as WO86/02170 on Apr. 10, 1986, Pat. No. 4,824,882.

[30] Foreign Application Priority Data

Oct. 5, 1984 [JP] Japan ................................. 59-210067

[51] Int. Cl.$^5$ .................. F21V 9/14; G02B 5/30
[52] U.S. Cl. ...................................... 252/585; 524/89; 359/63; 359/96; 359/490
[58] Field of Search ................ 252/299.01, 299.1, 600, 252/585, 299.5; 430/20; 524/89; 350/349; 428/220, 480, 1

[56] References Cited

U.S. PATENT DOCUMENTS

| | | | |
|---|---|---|---|
| 3,892,734 | 7/1975 | Okubo et al. | 260/240 D |
| 4,356,102 | 1/1982 | Aftergut et al. | 252/299 |
| 4,359,570 | 11/1982 | Davis et al. | 528/289 |
| 4,624,532 | 11/1986 | Aftergut et al. | 350/349 |

FOREIGN PATENT DOCUMENTS

| | | | |
|---|---|---|---|
| 2121570 | 11/1972 | Fed. Rep. of Germany | 252/585 |
| 8119826 | 4/1982 | France . | |
| 51-103131 | 8/1975 | Japan | 252/585 |
| 51-54447 | 1/1976 | Japan . | |
| 52-10330 | 8/1976 | Japan | 252/585 |
| 52-010342 | 1/1977 | Japan . | |
| 54-45153 | 2/1979 | Japan . | |
| 56-62873 | 5/1981 | Japan . | |
| 57-34117 | 2/1982 | Japan . | |
| 57-34177 | 2/1982 | Japan . | |
| 57-84409 | 4/1982 | Japan . | |
| 57-117580 | 7/1982 | Japan . | |
| 57-117582 | 7/1982 | Japan . | |
| 57-205448 | 12/1982 | Japan . | |
| 58-53979 | 3/1983 | Japan | 252/585 |
| 58-66902 | 4/1983 | Japan . | |
| 58-68008 | 4/1983 | Japan . | |
| 58-68704 | 4/1983 | Japan | 252/584 |
| 58-124621 | 7/1983 | Japan . | |
| 58-125002 | 7/1983 | Japan . | |
| 59-036181 | 2/1984 | Japan | 252/299.1 |
| 59-94706 | 3/1984 | Japan . | |
| 59-111113 | 4/1984 | Japan . | |
| 59-182877 | 10/1984 | Japan | 252/585 |
| 59-182878 | 10/1984 | Japan | 252/299.1 |

OTHER PUBLICATIONS

Wahlstrom, "Optical Crystallography", 5th Ed., Chapter 4, pp. 71-82, 1980.
Vickerstaff, "The Physical Chemistry of Dyeing", Interscience Publishers, 1954, pp. 184-185.

*Primary Examiner*—John S. Maples
*Assistant Examiner*—Richard Treanor
*Attorney, Agent, or Firm*—Fisher, Christen & Sabol

[57] ABSTRACT

Disclosed is a polarizing film comprising a hydrophobic polymer containing a dichroic organic colorant in an oriented state which is characterized in that the dichroic organic colorant is substantially insoluble in water, organic solvents and liquid crystals and the dichroic ratio of the colorant is not less than 7 when it is measured with the film obtained by blending the colorant intimately with polyethylene terephthalate, melting the resulting blend and forming it into a film. This polarizing film has exceptionally excellent moisture resistance and thermal resistance.

4 Claims, No Drawings

POLARIZING FILM

This application is a continuation of prior U.S. application Ser. No. 308,031, filing date Feb. 27, 1989, abandoned, which is a division of application Ser. No. 866,492, filing date as PCT JP85/00328 on Jun. 12, 1985, published as WO86/02170 on Apr. 10, 1986, now U.S. Pat. No. 4,824,882.

TECHNICAL FIELD

This invention relates to polarizing films and, more particularly, to a novel polarizing film having exceptionally excellent moisture resistance and thermal resistance.

BACKGROUND ART

Polarizing films which are now being used most commonly comprise a base film formed of a polyvinyl alcohol resin and endowed with polarizing power by an iodine compound and/or a dichroic substance such as an acid dye or direct dye having a preselected structure. In this type of polarizing films, durability is usually secured by covering both sides thereof with filmy materials (hereinafter referred to as protective coat layers) having moisture resistance and, on at least one side, transparency. That is, the shortcoming of the inner polarizing film layer (hereinafter referred to as the polarizer layer) significantly lacking in durability from its nature has been overcome by protecting both sides thereof with the protective coat layers to secure adequate durability for practical purposes.

As an important constituent element of liquid-crystal display devices, polarizing films are now being used in large quantities. However, as the field of application of liquid-crystal display devices is enlarged, there is an increasingly strong demand for improved durability, particularly moisture resistance and thermal resistance, of the polarizing films used therein.

A number of propositions have been made to meet such a demand. To sum up, these propositions can be classified into three methods. The first method is to use a conventional polarizer comprising a combination of a polyvinyl alcohol resin and a water-soluble dichroic dye and protect it with protective coat layers formed of a material (such as a cellulose acetate resin, an acrylic resin, a polyester resin, a polyurethane resin or the like) having better durability than the polyvinyl alcohol resin. This method can produce a considerable improvement in durability. However, such an improvement in durability has its limit because the edges of the polarizer exposed at the cut ends of the polarizing film have poor moisture resistance and the base resin of the polarizer has inherently low thermal resistance. The second method is to form a polarizing film of a hydrophobic polymer having a polyene structure with conjugated double bonds. However, this method has not yet attained technological completeness because, though having improved moisture resisntance, such a polarizing film has such disadvantages as a change in transmittance due to an augmentation of polyene structure induced by heat or other causes, a basically low degree of polarization, and the like. The third method is an attempt to form a polarizing film or polarizer by coloring a hydrophobic polymer, typified by polyesters, polyamides and the like, with a dichroic colorant and then stretching the resulting film, and the present invention basically belongs to this method. According to the third method, it is possible in principle to radically solve the long-standing problems of moisture resistance, thermal resistance and the like. In practice, however, few dichroic colorants exhibiting a high degree of dichroism in such a hydrophobic polymer have been proposed and this fact imposes restrictions on the completion of the technique for forming polarizing films according to the third method.

The prior art relating to durable polarizing films include, for example, Japanese Patent Laid-Open No. 84409/'82, Japanese Patent Laid-Open No. 68008/'83 in the name of the present inventors, and the like. All of them are concerned with polarizing films to which dichroic dyes developed for use with liquid crystals are applied. Immediately after manufacture, these polarizing films may have polarizing performance comparable to that of conventional PVA type polarizing films. However, they are disadvantageous from a practical point of view in that their long-term use, especially in a heated state, causes a marked reduction in polarizing power. The main cause for this disadvantage lies in the fact that dichroic dyes for use with liquid crystals have generally been selected so as to have a structure which permits them to be dissolved in liquid crystals at the highest possible concentration. However, in a film base material comprising a hydrophobic resin such as polyethylene terephthalate, the molecules of such a dye are thought to shift easily owing to their thermal motion or the like, especially in a heated atate, and disturb their own orientation. Moreover, during the manufacture of such a polarizing film, the film having passed through a stretching step is usually subjected to a heat-treatment step for the purpose of preventing its shrinkage or the like and securing its dimensional stability. Where a colorant (such as a dichroic dye for use with liquid crystals) having very high solubility in the hydrophobic base resin is used, the degree of polarization of the resulting film may be considerably high immediately after the stretching step. However, this film has the disadvantage that, after having passed through the heat-treatment step, its degree of polarization is substantially reduced. Accordingly, if it is desired to achieve a high degree of polarization in such a polarizing film, the stretched film cannot be subjected to an adequate heat treatment for heat-setting purposes, making it impossible to obtain a polarizing film having a sufficient degree of dimensional stability and a stabilized degree of polarization. On the contrary, if it is desired to obtain a polarizing film having a sufficient degree of dimensional stability and a stabilized degree of polarization, the stretched film must be subjected to an adequate heat treatment, making it impossible achieve a high degree of polarization.

In order to solve these problems, the present inventors have made extensive investigations and have found that, in polarizing films using a hydrophobic resin as the film base material, the most important characteristic required of a colorant used to solve the above-described problems is a high degree of dichroism and, moreover, such a colorant must have a certain degree of pigment nature. The present invention has been completed on the basis of these discoveries.

DISCLOSURE OF THE INVENTION

It is an object of the present invention to pay attention to a hydrophobic polymer having excellent transparency, moisture resistance, thermal resistance, weather resistance and the like as basic properties and provide a novel polarizing film using such a polymer as the film base material.

It is another object of the present invention to provide a novel polarizing film formed by using a hydrophobic polymer as the film base material and incorporating therein a colorant capable of imparting excellent polarizing power thereto.

These objects of the present invention can be accomplished by a polarizing film comprising a hydrophobic polymer containing a dichroic organic colorant in an oriented state which is characterized in that the dichroic organic colorant is substantially insoluble in water, organic solvents and liquid crystals and the dichroic ratio of the colorant is not less than 7 when it is measured with the film obtained by blending the colorant intimately with polyethylene terephthalate, melting the resulting blend and forming it into a film.

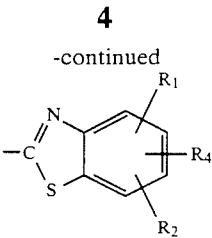

in which R$_4$ is a phenyl, biphenyl or naphthalene radical that may be substituted by R$_1$, R$_2$, —COOH and/or —COOCH$_3$, and ring A is a phenyl, biphenyl or naphthalene radical that may be substituted by R$_1$, R$_2$, —COOH and/or —COOCH$_3$, or an anthraquinone radical that may be substituted by X$_1$, X$_2$, X$_3$, X$_4$, X$_5$ and/or X$_6$; and n represents a whole number equal to 1, 2 or 3;

(3) compounds of the general formula

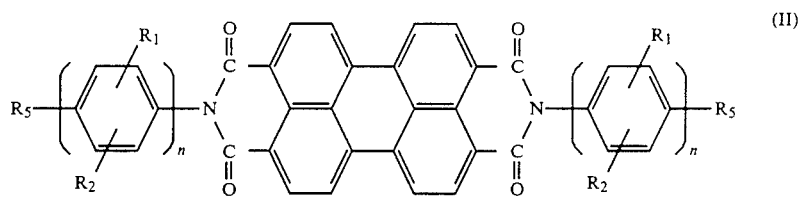

where R$_1$ and R$_2$ are as previously defined; R$_5$ represents —COOH, —COOCH$_3$, —COOC$_2$H$_5$, —COOR$_6$, alkyl groups of 1 to 10 carbon atoms, alkoxy groups of 1 to 10 carbon atoms,

BEST MODE FOR CARRYING OUT THE INVENTION

The dichroic organic colorant used in the present invention is selected from the groups of
(1) vat dyes and organic pigments;
(2) compounds of the general formula

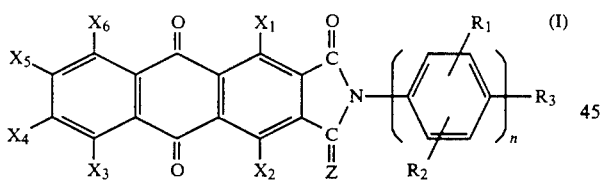

where X$_1$, X$_2$, X$_3$, X$_4$, X$_5$ and X$_6$ represent hydrogen atoms, halogen atoms, hydroxyl groups or amino groups that may be substituted by an alkyl group of 1 to 3 carbon atoms, and at least one of X$_1$, X$_2$, X$_3$ and X$_6$ is a hydroxyl group or an amino group that may be substituted by an alkyl group of 1 to 3 carbon atoms; Z represents an oxygen atom, a sulfur atom or an imino group; R$_1$ and R$_2$ independently represent hydrogen atoms, halogen atoms, methyl groups or methoxy groups; R$_3$ represents —COOH, —COOR$_4$, —CONH$_2$, —CONHR$_4$, —OOCR$_4$, —NHCOR$_4$, —N=N—R$_4$,

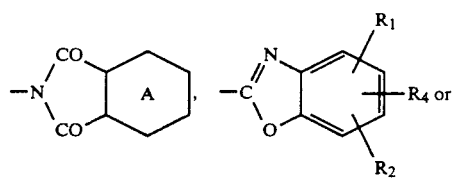

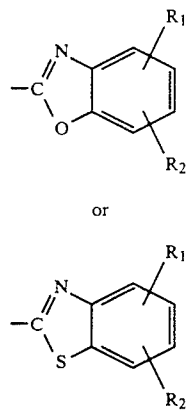

in which R$_6$ is a phenyl radical that may be substituted by R$_1$ and R$_2$; and n represents a whole number equal to 1, 2 or 3;

(4) compounds of the general formula

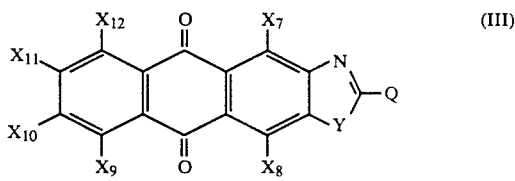

where Y represents an oxygen atom or a sulfur atom; X$_7$, X$_8$, X$_9$, X$_{10}$, X$_{11}$ and X$_{12}$ represent hydrogen atoms, halogen atoms, hydroxyl groups or amino groups that may be substituted by an alkyl group of 1 to 3 carbon atoms; Q represents an anthraquinone radical that may be substituted by $X_7, X_8, X_9, X_{10}, X_{11}$ or $X_{12}$, or a group of the formula

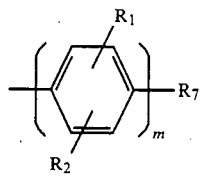

where $R_1$ and $R_2$ are as previously defined; m represents a whole number equal to 1, 2 or 3, and $R_7$ represents —COOH, —COOR$_4$, —CONH$_2$, —CONHR$_4$, —COCR$_4$, —NHCOR$_4$, —N=N—R$_4$,

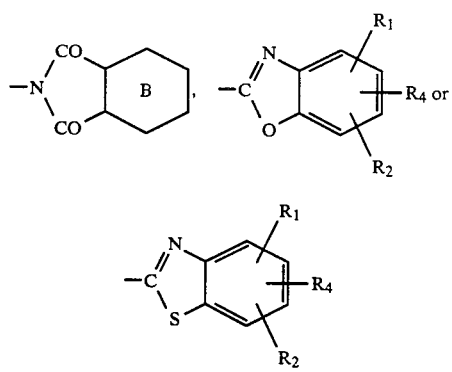

in which $R_4$ and ring B represent phenyl, biphenyl or nephthalene radicals that may be substituted by $R_1$, $R_2$, —COOH and/or —COOCH$_3$; and (5) compounds of the general formula

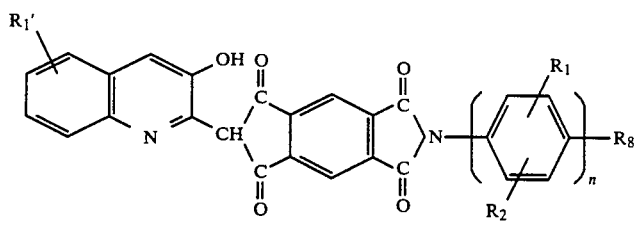

where $R_1$, $R_2$ and n are as previously defined; $R_1'$ represents a hydrogen atom, a halogen atom, a methyl group or a methoxy group; $R_8$ represents a hydrogen atom, —COOH, —COOR$_4$, —CONH$_2$, —CONHR$_4$, —COCR$_4$, —NHCOR$_4$, —N=N—R$_4$,

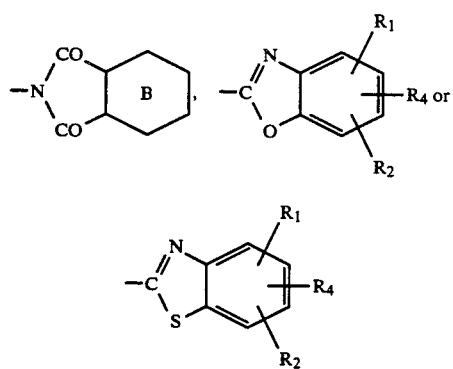

in which $R_4$ and ring B are previously defined.

It is important that these dichroic organic colorants for use in the polarizing film of the present invention not only exhibit dichroism, but also are substantially insoluble in water, organic solvents and liquid crystals. The term "substantially insoluble" as used herein means that, at room temperature, namely about 25° C., the solubilities of the dichroic colorant in water, organic solvents and liquid crystals are not greater than 0.05% by weight and preferably not greater than 0.01% by weight. Moreover, the term "organic solvents" as used herein means readily available inert organic solvents having a boiling point of 250° C. or below and comprehends acetone, methyl alcohol, ethyl alcohol, chloroform, benzene, toluene, xylene, nitrobenzene, chlorobenzene, o-dichlorobenzene, N,N-dimethylformamide, ethyle acetate and the like. Furthermore, the term "liquid crystals" as used herein comprehends liquid crystals having a nematic or smectic phase exhibiting fluidity at room temperature, namely Schiff base type liquid crystals, biphenyl type liquid crystals, phenylcyclohexane type liquid crystals, ester type liquid crystals, pyrimidine type liquid crystals and mixtures thereof.

As described above, it is necessary that the dichroic colorant constituting an important element in the present invention should be substantially insoluble in orgaic solvents and liquid crystals. This feature lies in the fact that the colorant of the present invention has a certain pigment nature. This means that a colorant for use in the present invention cannot be selected by dissolving it in a liquid crystal and determining whether it has a high degree of dichroism or not. In other words, a well-defined means has not necessarily been available for determining whether a dichroic colorant for use in the present invention has a sufficiently high degree of dichroism for use in polarizing films.

According to the present invention, a convenient and effective method for determining the suitability of a colorant for use in the present invention has been established by measuring its degree of dichroism in polyethylene terephthalate being a typical hydrophobic polymer. This method comprises blending an appropriate amount of colorant intimately with pellets of polyethylene terephthalate having an intrinsic viscosity of 0.6 to 0.75, melting the resulting blend, forming the molten blend into a film, stretching the film longitudinally with a stretch ratio of at least 3 at a temperature approaching or exceeding its glass transition point so as to allow its width to vary freely, and then using the stretched film as a specimen to measure the dichroic ratio of the colorant at its maximum absorption wavelength in the visible light region. The dichroic colorants which can be used in the present invention have a dichroic ratio of not less than 7 when it is measured according to this method. These colorants are suitable for use in polarizing films comprising a film base material selected from aromatic polyesters (including polyethylene terephthalate) and other hydrophobic polymers.

As described above, the present inventors have found a method for measuring the dichroic ratios of dichroic colorants and a criterion for judging the suitability of such dicroic ratios for use in the present invention.

The above method and criterion make it easy to select a colorant which, though having a pigment nature, has hitherto involved difficulties in determining whether it has a sufficiently high degree of dichroism for use in polarizing films or not. In addition, the use of a colorant so selected provides a polarizing film having excellent polarizing power as well as excellent durability from the viewpoint of moisture resistance and thermal resistance.

The colorants of the present invention will hereinafter be explained in greater detail.

The first group consists of colorants selected from well-known vat dyes and organic pigments. More specifically, they are selected from the dyes and pigments described in "New Dye Handbook" (edited by the Japanese Society of Organic Synthetic Chemistry and published by Maruzen on July 20, 1970), pp. 683–721 and pp. 977–1109, as well as Yutaka Hosoda, "Chemistry of Dyes (5th edition)" (published by Gihodo on July 15, 1968), pp. 250–336 and pp. 697–759. These colorants have the common properties of being insoluble in water and having a relatively high molecular weight. Typical examples of the dichroic colorants belonging to this group are listed in Table 1.

TABLE 1

| Colorant No. | Structural formula of colorant |
| --- | --- |
| 1-1 | 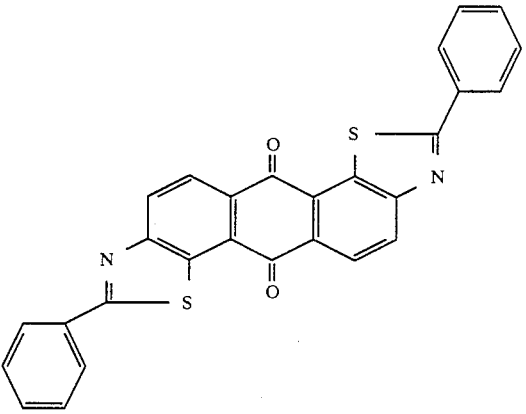 |
| 1-2 | 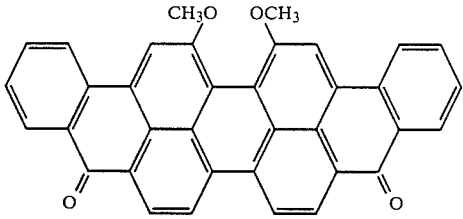 |
| 1-3 | 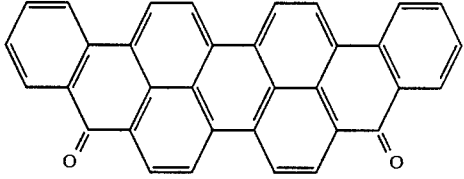 |
| 1-4 | 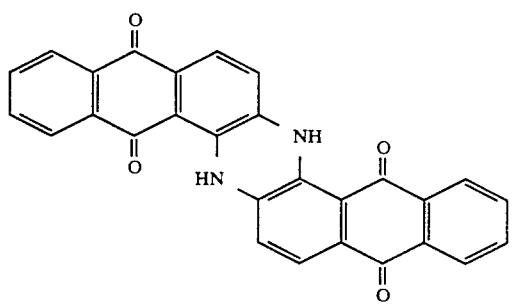 |

TABLE 1-continued

| Colorant No. | Structural formula of colorant |
|---|---|
| 1-5 | [triphenodioxazine with two Cl substituents] |
| 1-6 | [dichloro-violanthrone-type polycyclic quinone] |
| 1-7 | [naphthalene-1,4,5,8-tetracarboxylic bis(benzimidazole) structure] |
| 1-8 | [diamino-anthanthrone/violanthrone-type dione with two $NH_2$ groups] |
| 1-9 | [bis-anthraquinonyl-diamine structure]$\cdot Cl_n$, $n = 1 \sim 3$ |
| 1-10 | [NH-bridged bis(benzanthrone) structure] |

TABLE 1-continued
| Colorant No. | Structural formula of colorant |
|---|---|
| 1-11 | 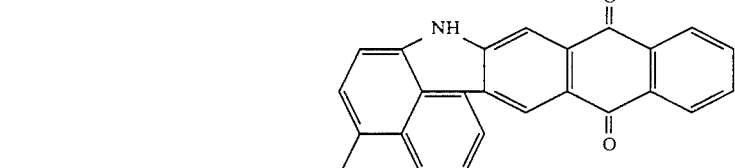 |
| 1-12 | 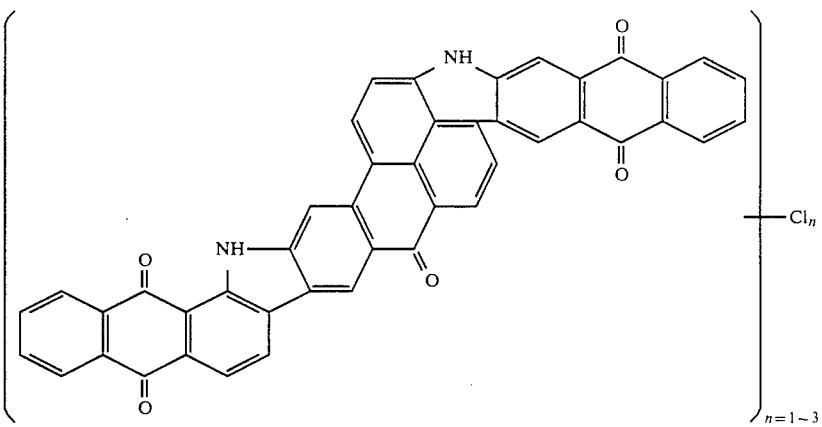 |
| 1-13 | 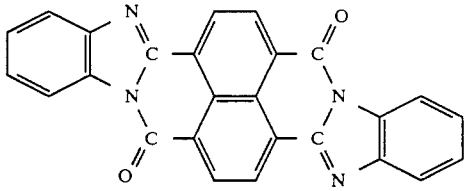 |
| 1-14 | 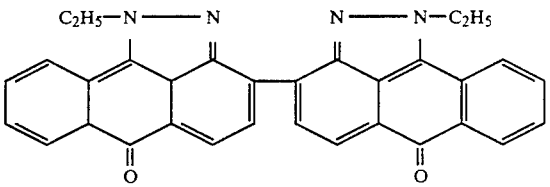 |
| 1-15 |  |
| 1-16 | 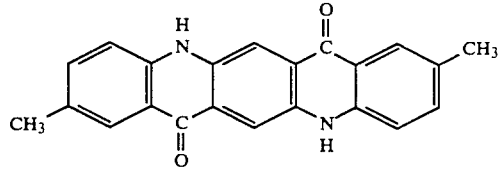 |

TABLE 1-continued
| Colorant No. | Structural formula of colorant |
|---|---|
| 1-17 | 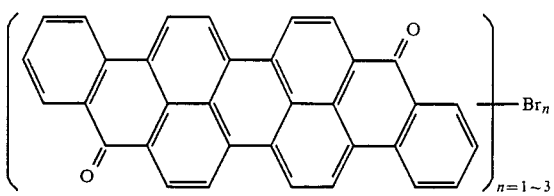 |
| 1-18 | 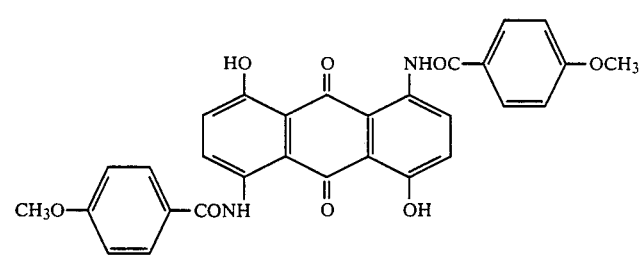 |
| 1-19 | 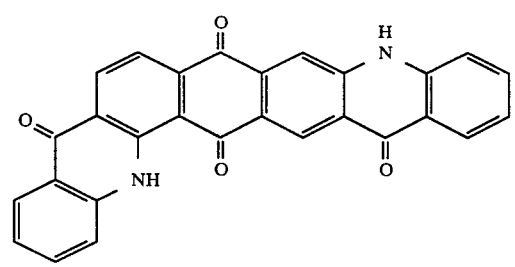 |
| 1-20 | 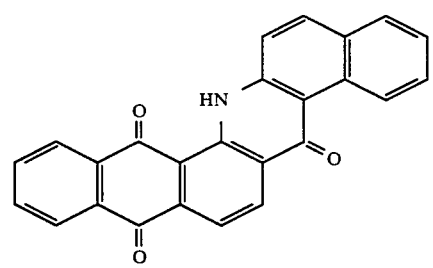 |
| 1-21 | 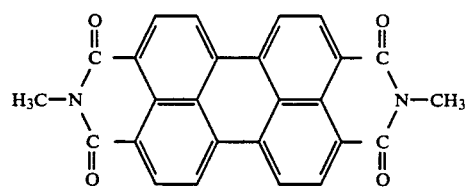 |
| 1-22 | 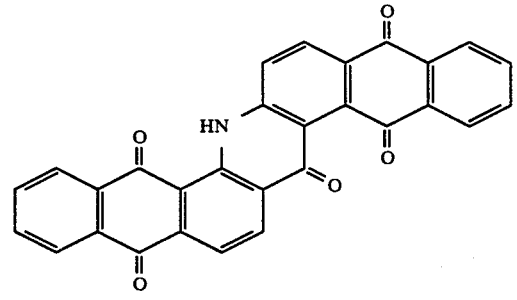 |

TABLE 1-continued

| Colorant No. | Structural formula of colorant |
|---|---|
| 1-23 | |
| 1-24 | |
| 1-25 | |
| 1-26 | |

TABLE 1-continued
| Colorant No. | Structural formula of colorant |
|---|---|
| 1-27 | 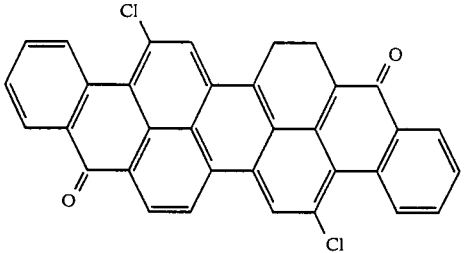 |
| 1-28 | 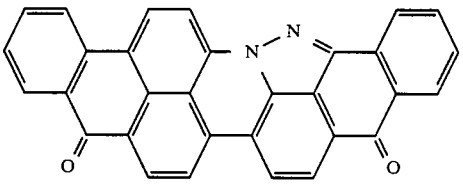 |
| 1-29 | 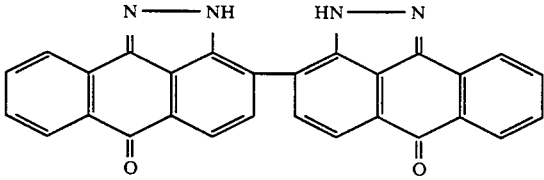 |
| 1-30 | 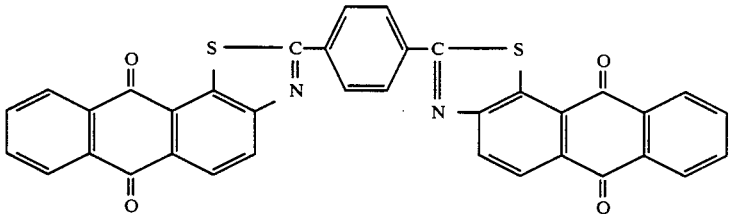 |
| 1-31 | 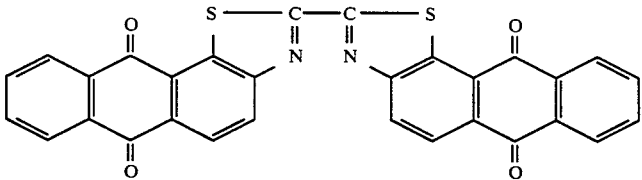 |
| 1-32 | 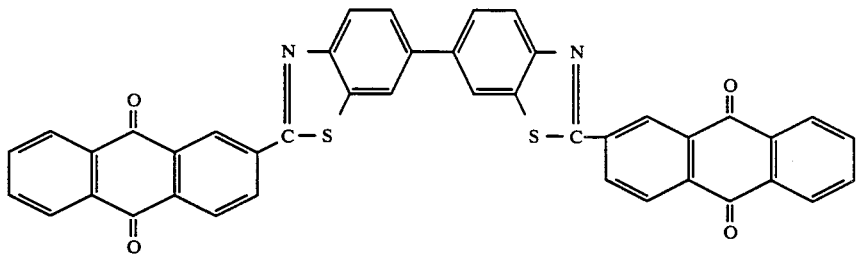 |
| 1-33 | 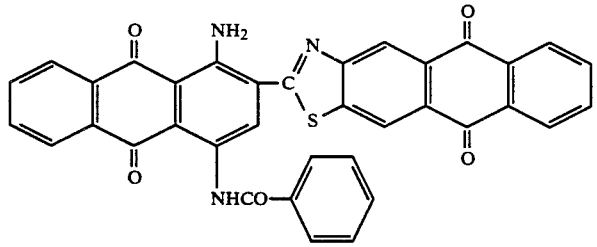 |

TABLE 1-continued
| Colorant No. | Structural formula of colorant |
|---|---|
| 1-34 | 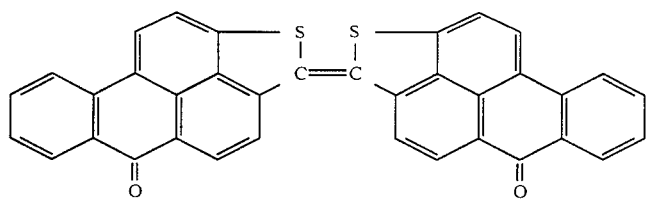 |
| 1-35 | 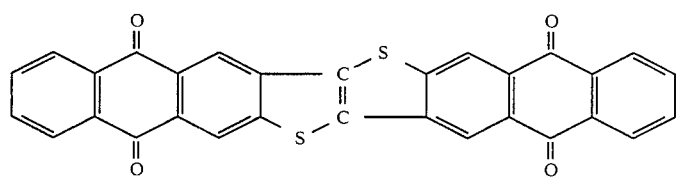 |
| 1-36 | 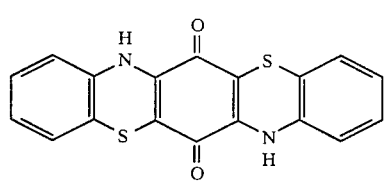 |
| 1-37 | 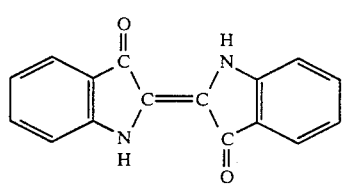 |
| 1-38 | 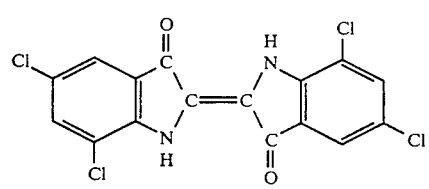 |
| 1-39 | 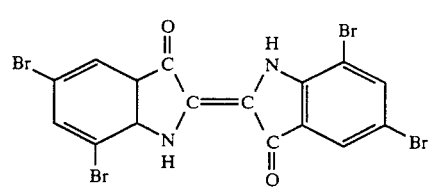 |
| 1-40 | 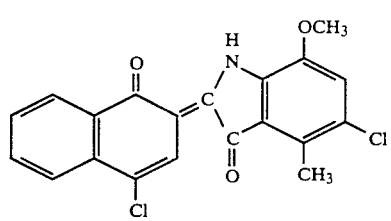 |
| 1-41 | 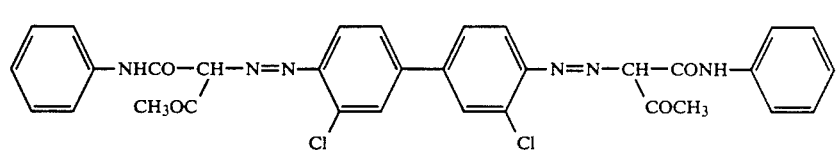 |

| Colorant No. | Structural formula of colorant |
|---|---|
| 1-42 | |
| 1-43 | |
| 1-44 | |
| 1-45 | |
| 1-46 | |
| 1-47 | |
| 1-48 | |

The second group consists of colorants having a novel structure represented by the general formula

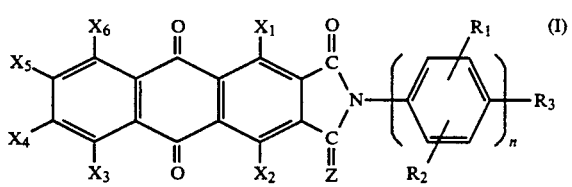

wherein $X_1$, $X_2$, $X_3$, $X_4$, $X_5$, $X_6$, Z, $R_1$, $R_2$, $R_3$ and n are as previously defined.

The colorants represented by the above general formula (I) can be synthesized according to any of well-known processes including, for example, those disclosed in Japanese Patent Publication No. 3710/'66 and the like. Typically, compounds of the general formula (I) can be obtained by reacting a compound of the general formula

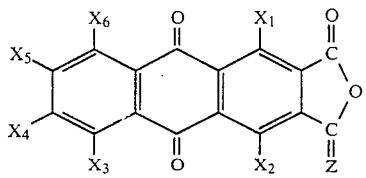

(Ia)

where $X_1$, $X_2$, $X_3$, $X_4$, $X_5$, $X_6$ and Z are as defined for the general formula (I), with a compound of the general formula

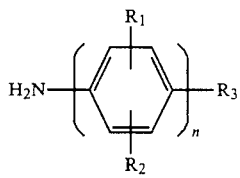

(Ib)

where $R_1$, $R_2$, $R_3$ and n are as defined for the general formula (I), under heated conditions in an organic solvent such as an alcohol (e.g., methanol, ethanol, propanol, butanol, ethylene glycol, methyl cellosolve, ethyl cellosolve or the like), benzene, toluene, xylene, monochlorobenzene, dichlorobenzene, nitrobenzene, N,N-dimethylformamide or the like. Alternatively, compounds of the general formula (I) can also be obtained according to various combinations of other well-known unit reactions.

All compounds falling within the scope of the general formula (I) have excellent properties which satisfy the requirements for the colorant used in the polarizing film of the present invention. In the general formula (I), preferred examples of $X_1$, $X_2$, $X_3$ and $X_6$ include hydrogen atoms, halogen atoms, hydroxyl groups, amino groups, methylamino groups, ethylamino groups, propylamino groups and the like. In particular, colorants having markedly high polarizing performance can be obtained when $X_1$ and $X_2$, or $X_3$ and $X_6$, or $X_1$, $X_2$, $X_3$ and $X_6$ simultaneously and independently represent hydroxyl groups, amino groups or methylamino groups. In this case, $X_4$ and $X_5$ should preferably be hydrogen atoms. Z may suitably be selected from an oxygen atom, a sulfur atom and an imino group, but an oxygen atom and a sulfur atom are preferred from the viewpoint of polarizing performance. As colorants for use in polarizing films, compounds of the general formula (I) are most distinctly characterized by selection of the substituent group $R_3$. In other words, they serve as colorants for use in polarizing films when the substituent group $R_3$ is properly selected so that they have particularly high initial polarizing performance and stable long-term polarizing performance. Specifically, preferred examples of the substituent group $R_3$ include —COOH, —CONH$_2$,

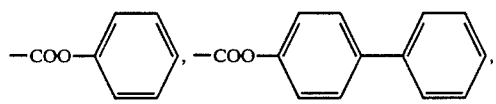

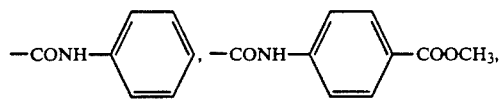

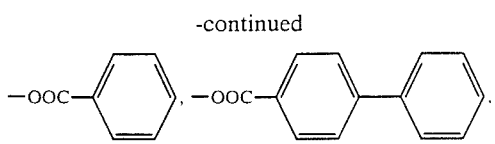

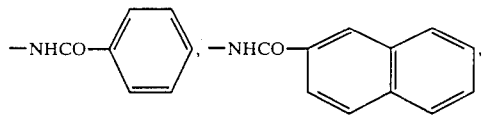

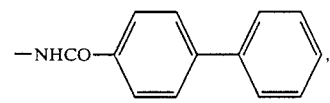

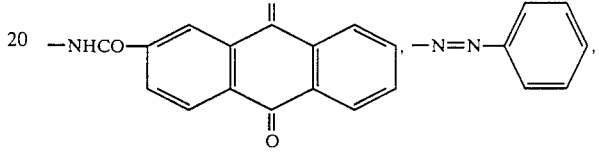

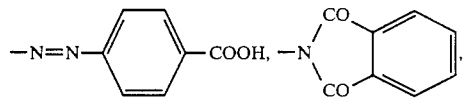

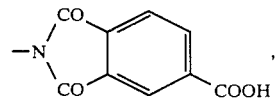

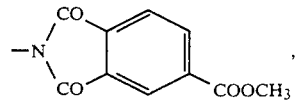

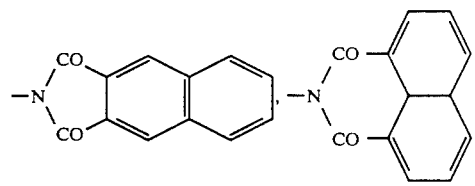

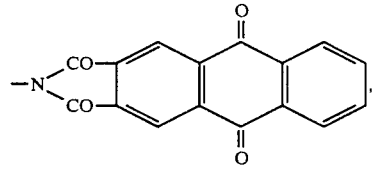

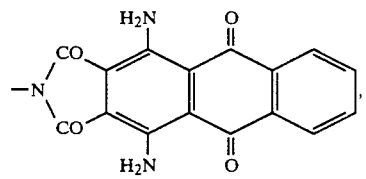

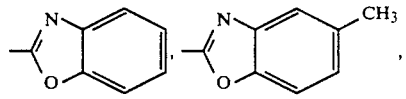

and the like. Especially preferred are amino groups such as —NHCOR$_4$, —CONHR$_4$, etc.; imide groups represented by

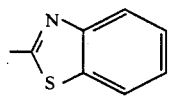

and groups containing a benzoxazole or benzothiazole radical.

Moreover, compounds of the general formula (I) in which n=2 are especially preferred as colorants for use in polarizing films.

Typical examples of the dichroic colorants belonging to the second group are listed in Table 2.

TABLE 2

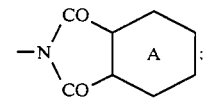

TABLE 2-continued
| Colorant No. | Structural formula of colorant |
|---|---|
| 2-8 | 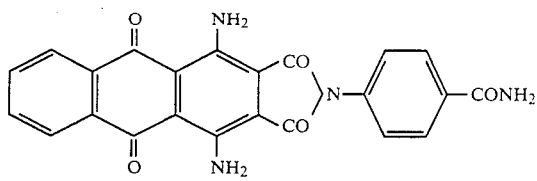 |
| 2-9 | 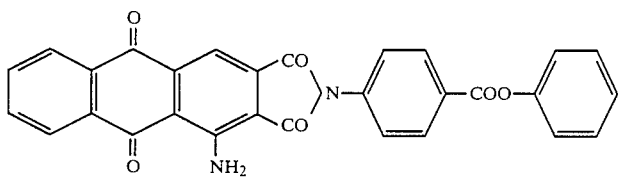 |
| 2-10 | 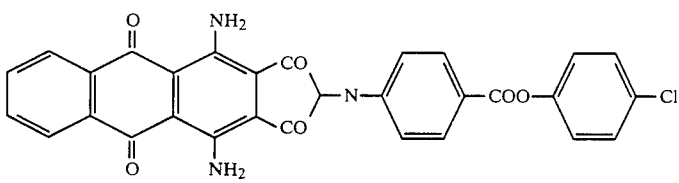 |
| 2-11 | 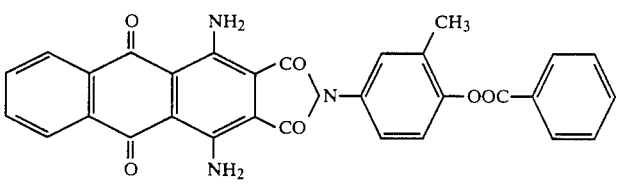 |
| 2-12 | 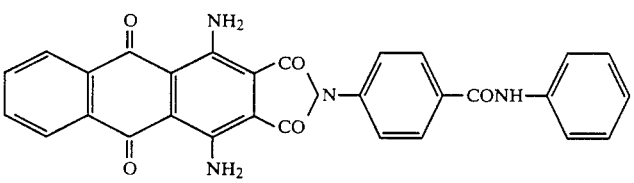 |
| 2-13 | 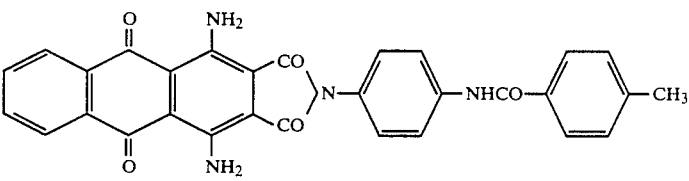 |
| 2-14 | 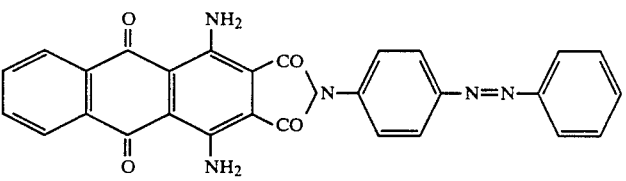 |
| 2-15 | 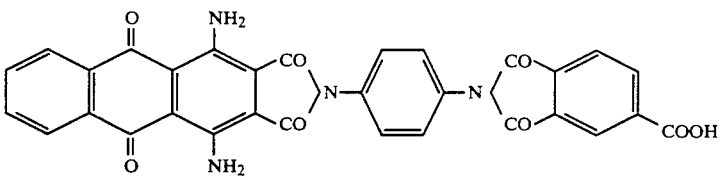 |

TABLE 2-continued
| Colorant No. | Structural formula of colorant |
|---|---|
| 2-16 | 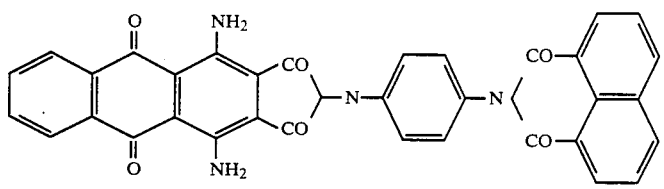 |
| 2-17 | 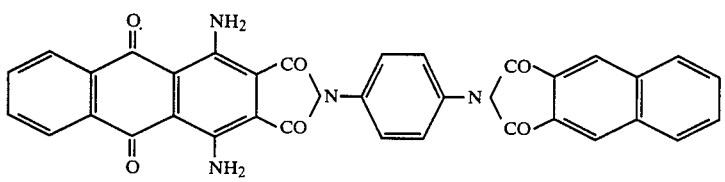 |
| 2-18 | 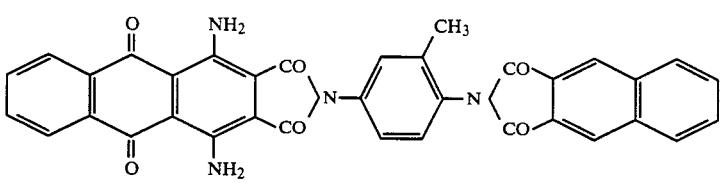 |
| 2-19 | 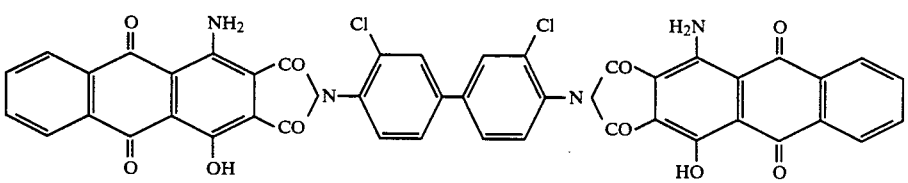 |
| 2-20 | 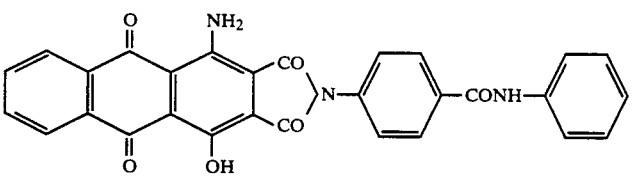 |
| 2-21 | 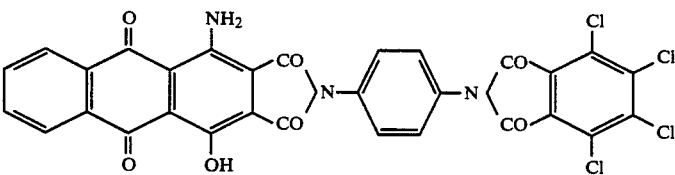 |
| 2-22 | 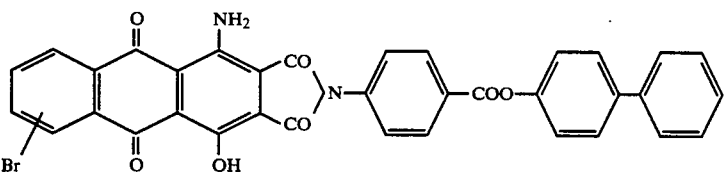 |
| 2-23 | 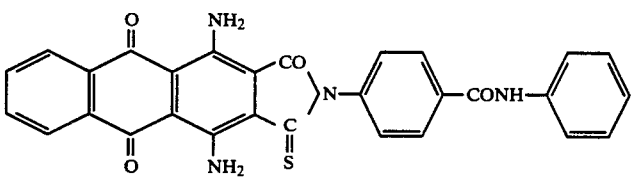 |

TABLE 2-continued

| Colorant No. | Structural formula of colorant |
|---|---|
| 2-24 | |
| 2-25 | |
| 2-26 | |
| 2-27 | |
| 2-28 | |
| 2-29 | |
| 2-30 | |
| 2-31 | |
| 2-32 | |

TABLE 2-continued
| Colorant No. | Structural formula of colorant |
|---|---|
| 2-33 | 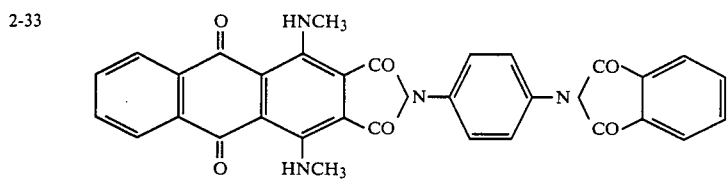 |
| 2-34 | 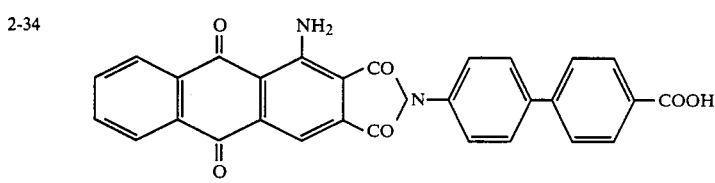 |
| 2-35 | 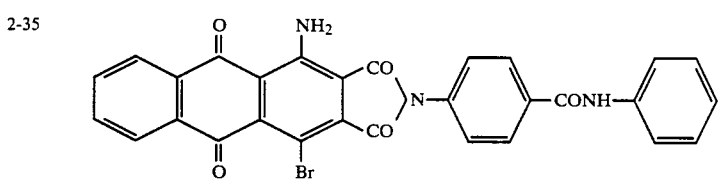 |
| 2-36 | 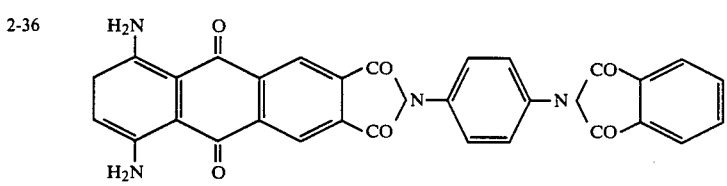 |
| 2-37 | 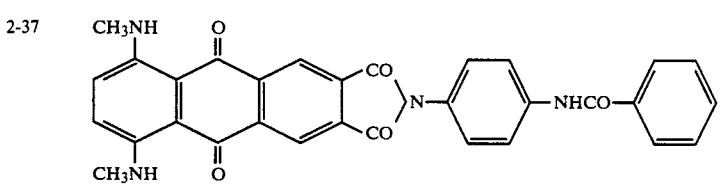 |
| 2-38 | 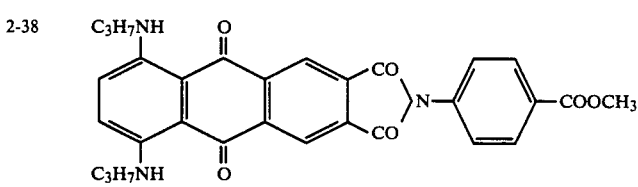 |
| 2-39 | 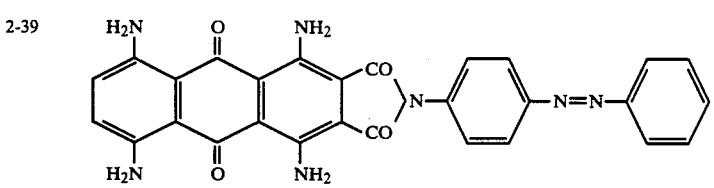 |
| 2-40 | 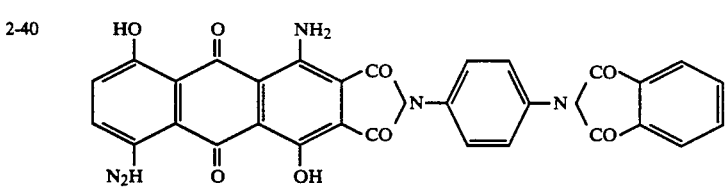 |

TABLE 2-continued

| Colorant No. | Structural formula of colorant |
|---|---|
| 2-41 | |
| 2-42 | |
| 2-43 | |
| 2-44 | |
| 2-45 | |
| 2-46 | |
| 2-47 | |
| 2-48 | |
| 2-49 | |

TABLE 2-continued

| Colorant No. | Structural formula of colorant |
|---|---|
| 2-50 | *anthraquinone with two NH₂ groups and fused imide-N linked to biphenyl-benzoxazole* |
| 2-51 | *anthraquinone with two NH₂ groups and fused imide-N linked to phenyl-benzothiazole* |
| 2-52 | *anthraquinone with two NH₂ groups and fused imide-N linked to biphenyl-benzothiazole* |
| 2-53 | *anthraquinone with two NH₂ groups and fused imide-N linked to biphenyl-(5-methyl)benzoxazole* |
| 2-54 | *anthraquinone with NH₂ and OH groups and fused imide-N linked to biphenyl-(5-methyl)benzoxazole* |
| 2-55 | *anthraquinone with two OH groups and fused imide-N linked to biphenyl-(5,6-dimethyl)benzoxazole* |
| 2-56 | *anthraquinone with two CH₃NH groups and fused imide-N linked to biphenyl-benzoxazole* |
| 2-57 | *anthraquinone with two CH₃NH groups and fused imide-N linked to biphenyl-(5-phenyl)benzoxazole* |

TABLE 2-continued

| Colorant No. | Structural formula of colorant |
|---|---|
| 2-58 | 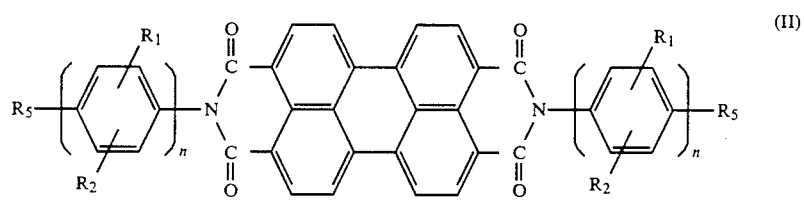 |
| 2-59 | |
| 2-60 | |

The third group consists of colorants represented by the general formula (II)

wherein $R_1$, $R_2$, $R_5$ and n are as previously defined.

The colorants represented by the above general formula (II) can be readily synthesized, for example, by boiling a perylenetetracarboxylic acid anhydride of the formula

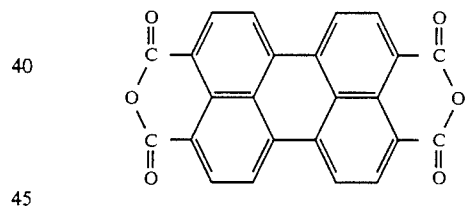

and an aromatic amine of the general formula (IIb)

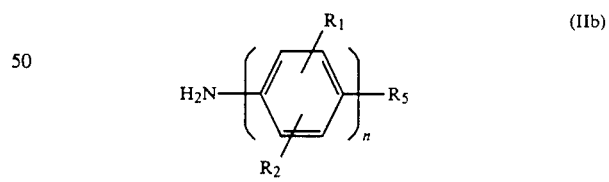

where $R_1$, $R_2$, $R_5$ and n are as previously defined, in an inert solvent such as nitrobenzene.

Typical examples of the dichroic colorants belonging to the third group are listed in Table 3.

TABLE 3

| Colorant No. | Structural formula of colorant |
|---|---|
| 3-1 | Perylene bis-imide with N-(4-ethoxyphenyl) groups on both sides (OC$_2$H$_5$ / H$_5$C$_2$O) |
| 3-2 | Perylene bis-imide with N-(4-nonyloxyphenyl) groups on both sides (OC$_9$H$_{19}$ / H$_{19}$C$_9$O) |
| 3-3 | Perylene bis-imide with N-(3,5-dimethylphenyl) groups on both sides (CH$_3$ / CH$_3$) |
| 3-4 | Perylene bis-imide with N-(4-ethoxycarbonylphenyl) groups on both sides (COOC$_2$H$_5$ / H$_5$C$_2$OOC) |
| 3-5 | Perylene bis-imide with N-[4-(4-methylphenoxycarbonyl)phenyl] groups on both sides (COO-C$_6$H$_4$-CH$_3$ / CH$_3$-C$_6$H$_4$-OOC) |

TABLE 3-continued
| Colorant No. | Structural formula of colorant |
|---|---|
| 3-6 |  |
| 3-7 |  |
| 3-8 |  |
| 3-9 |  |
| 3-10 |  |

TABLE 3-continued

| Colorant No. | Structural formula of colorant |
|---|---|
| 3-11 | perylene-3,4,9,10-tetracarboxylic diimide with both N-substituents = 4-(4-phenylphenyl)phenyl (p-terphenyl-4-yl) |
| 3-12 | perylene-3,4,9,10-tetracarboxylic diimide with both N-substituents = 4-($C_8H_{17}$)phenyl |

The fourth group consists of colorants represented by the general formula

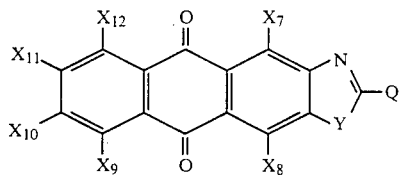 (III)

wherein $X_7$, $X_8$, $X_9$, $X_{10}$, $X_{11}$, $X_{12}$, Y and Q are as previously defined.

The colorants represented by the above general formula (III) can be synthesized by condensing a compound of the general formula

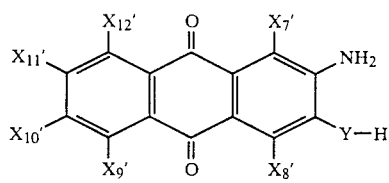 (IIIb)

where $X'_7$, $X'_8$, $X'_9$, $X'_{10}$, $X'_{11}$ and $X'_{12}$ are the same atoms or groups as $X_7$, $X_8$, $X_9$, $X_{10}$, $X_{11}$ and $X_{12}$, respectively, in formula (III), or atoms or groups which can be converted thereto or replaced thereby, and Y is as defined for formula (III), with a carboxylic acid chloride of the general formula

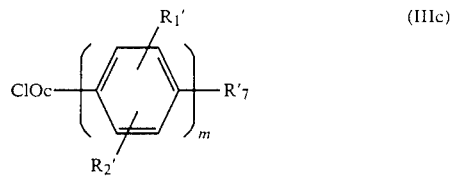 (IIIc)

where $R'_1$, $R'_2$ and $R'_7$ are the same atoms or groups as $R_1$, $R_2$ and $R_7$, respectively, in formula (IIIa), or atoms or groups which can be converted thereto or replaced thereby, and m is as defined for formula (IIIa), in an inert solvent such as nitrobenzene or o-dichlorobenzene to effect a ring closure reaction; and, if necessary, converting to or replacing by the atoms or groups represented by $X_7$, $X_8$, $X_9$, $X_{10}$, $X_{11}$, $X_{12}$ and the like.

Typical examples of the dichroic colorants belonging to the fourth group are listed in Table 4.

TABLE 4

| Colorant No. | Structural formula of colorant |
|---|---|
| 4-1 | |
| 4-2 | |
| 4-3 | |
| 4-4 | |
| 4-5 | |

TABLE 4-continued
| Colorant No. | Structural formula of colorant |
|---|---|
| 4-6 | 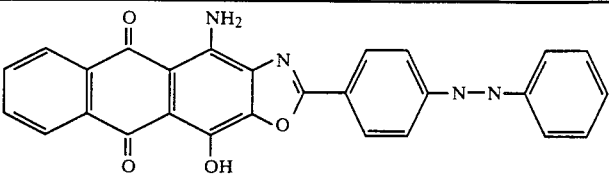 |
| 4-7 | 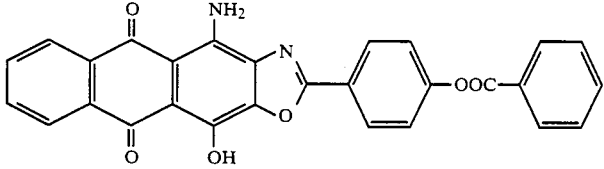 |
| 4-8 | 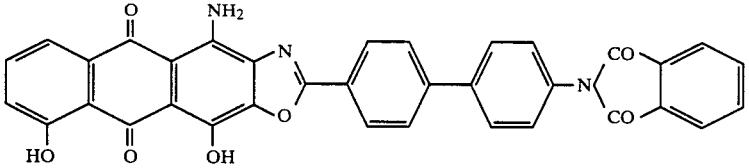 |
| 4-9 | 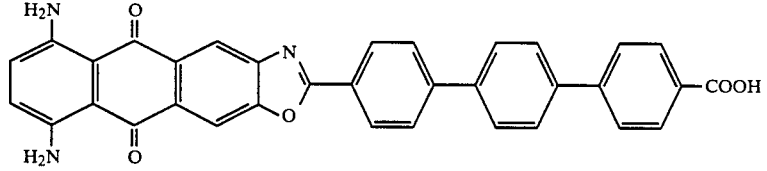 |
| 4-10 | 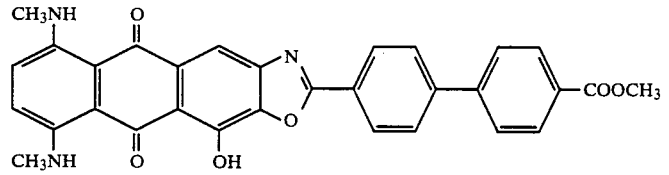 |
| 4-11 | 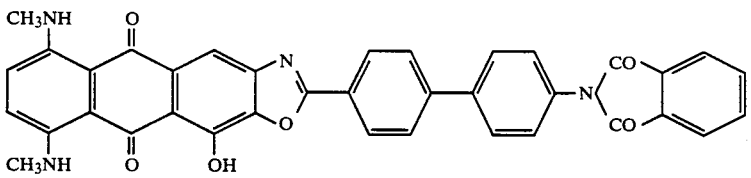 |
| 4-12 | 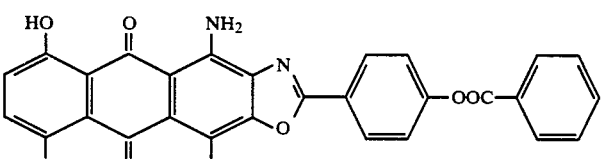 |
| 4-13 | 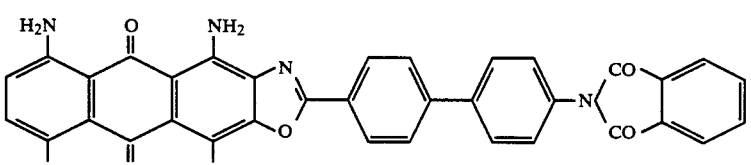 |
| 4-14 | 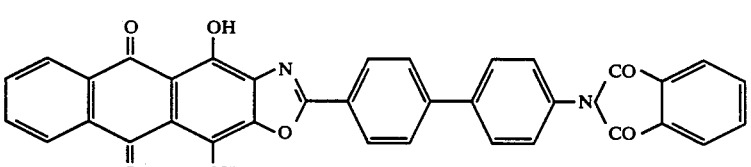 |

TABLE 4-continued

| Colorant No. | Structural formula of colorant |
|---|---|
| 4-15 | |
| 4-16 | |
| 4-17 | |
| 4-18 | |
| 4-19 | |
| 4-20 | |
| 4-21 | |
| 4-22 | |

TABLE 4-continued

| Colorant No. | Structural formula of colorant |
| --- | --- |
| 4-23 | |
| 4-24 | |
| 4-25 | |
| 4-26 | |
| 4-27 | |
| 4-28 | |
| 4-29 | |
| 4-30 | |

The fifth group consists of colorants represented by the general formula

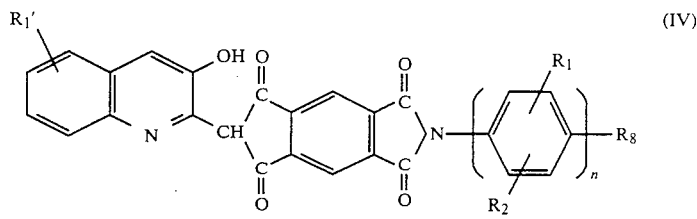

(IV)

wherein $R_1$, $R_2$, $R_8$, $R^1$ and n are as previously defined.

The colorants represented by the above general formula (IV) can be synthesized by condensing a compound of the general formula

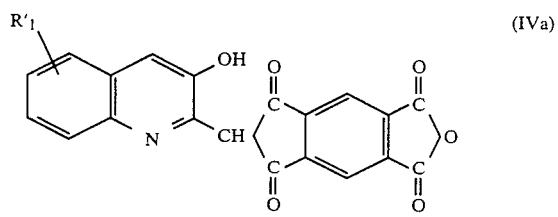

(IVa)

where $R^1$, is as previously defined, with an amine compound of the general formula

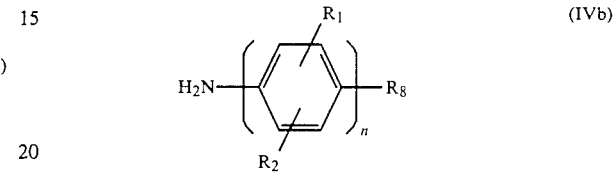

(IVb)

where $R_1$, $R_2$, $R_8$ and n are as previously defined, in an inert solvent such as nitrobenzene or o-dichlorobenzene.

Typical examples of the dichroic colorants belonging to the fifth group are listed in Table 5.

TABLE 5

| Colorant No. | Structural formula of colorant |
|---|---|
| 5-1 | |
| 5-2 | |
| 5-3 | |
| 5-4 | |
| 5-5 | |

TABLE 5-continued
| Colorant No. | Structural formula of colorant |
|---|---|
| 5-6 | 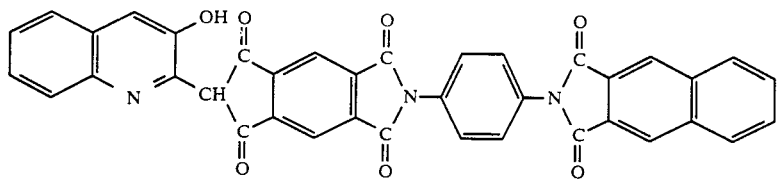 |
| 5-7 | 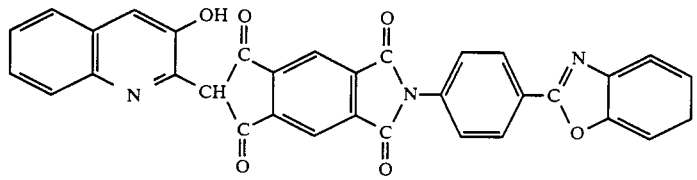 |
| 5-8 | 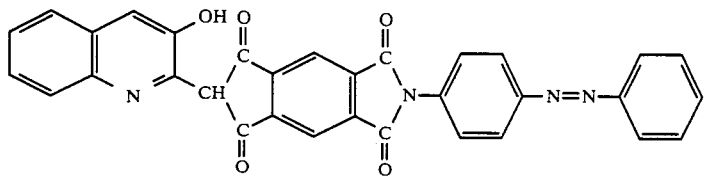 |
| 5-9 | 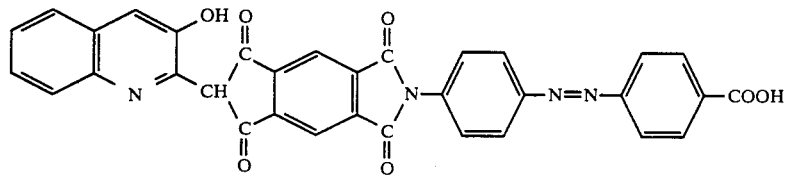 |
| 5-10 | 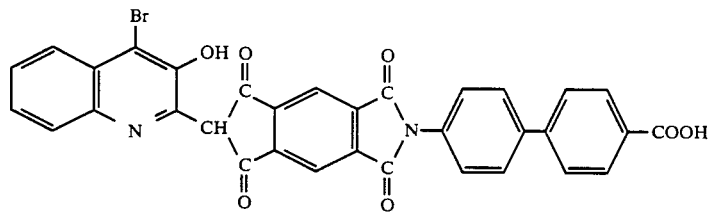 |
| 5-11 | 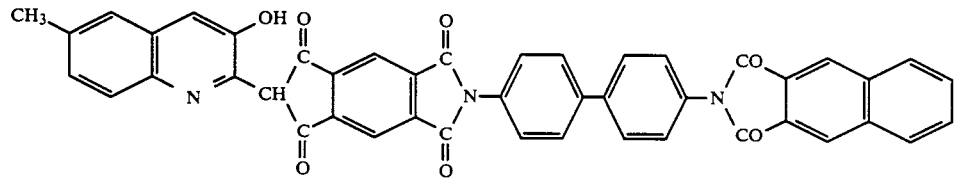 |
| 5-12 | 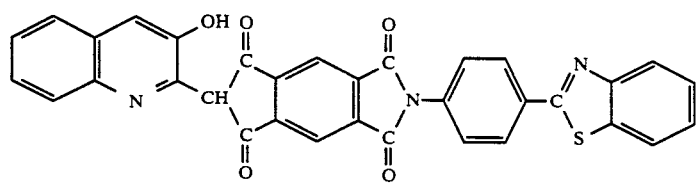 |
| 5-13 | 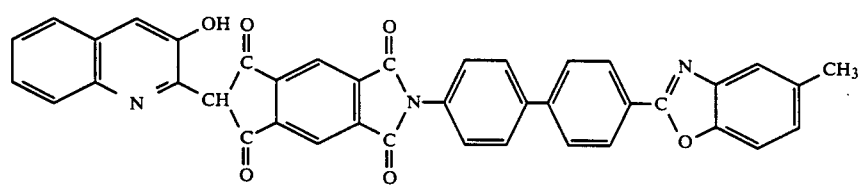 |

TABLE 5-continued

| Colorant No. | Structural formula of colorant |
|---|---|
| 5-14 | |
| 5-15 | |
| 5-16 | |
| 5-17 | |
| 5-18 | |
| 5-19 | |
| 5-20 | |
| 5-21 | |

As the colorants used in making the polarizing film of the present invention, commercially available products The polarizing film of the present invention contains at least one of the above-described colorants. In order to obtain a polarizing film having a desired color and particularly a neutral gray color, it is preferable to select a number of such colorants and use them in admixture. Furthermore, such colorants may be used in combination with dichroic colorants outside the scope of the present invention and, in some cases, non-dichroic colorants or other polarizing substances.

The hydrophobic polymer used in the present invention can be any of various organic high-molecular compounds whose molecules have a straight-chain structure containing no hydrophilic group. However, it is preferable to use such a polymer having thermoplasticity. Specific examples thereof include halogenated vinyl polymer resins, acrylic resins, polyolefin resins, polyamide resins, polyimide resins, polyester resins, polycarbonate resins, polyether-sulfone resins and the like. Among others, resins containing at least 80% by weight of aromatic polyester resin components (such as polyethylene terephthalate, polyethylene naphthalate, polybutylene terephthalate and the like) having excellent thermal resistance, moisture resistance and transparency are preferred.

The amount of colorant used relative to the base polymer comprising a hydrophobic polymer as described above is determined in consideration of the coloring power of the colorant and the thickness of the desired polarizing film. However, the amount of colorant used is preferably adjusted so that the visible light transmittance of the resulting polarizing film will be 30 to 60% per sheet. Where a standard colorant is used and the thickness of the resulting polarizing film is 30 to 200 u, the amount of colorant used may range from 0.01 to 10% by weight based on the base resin.

The polarizing film of the present invention can be made by melting a base polymer together with at least one colorant selected from the above-described groups, and other colorants added as desired, forming the colored molten polymer into a film or sheet, stretching it longtudinally transversely at a temperature of 50° to 150° C. with a stretch ratio of 3 to 10, and then heat-treating it at a temperature of 100° to 230° C. for a period of time ranging from 1 second to 30 minutes. Although the aforesaid unidirectional stretching may be adequate, the mechanical strength of the film can further be enhanced, if desired, by stretching it with a stretch ratio of about 1.1 to 2 in the direction perpendicular to the principal stretching direction.

The polarizing film so made can be processed into various forms of films or sheets according to the desired purpose and put to practical use. More specifically, the film made by the above-described method may used, for example, (a) as it is; (b) in the form of a polarizing sheet or film provided on one or both sides with a protective coat layer having excellent optical clarity and mechanical strength and comprising, for example, a layer of colored or uncolored glass or synthetic resin; (c) in the form of a polarizing film coated on one or both sides with an adhesive for ease of application to liquid-crystal displays, window panes and spectacles on which the polarizing film is commonly used; (d) in the form of a polarizing film having on one surface a transparent electrically-conductive layer of indium-tin oxide or other material formed by a well-known process such as vapor deposition, sputtering or coating; and the like. They can also be utilized as materials for the formation of the cells of liquid-crystal display devices.

The present invention will be more clearly understood by reference to the following examples which illustrate typical colorants in accordance with the invention and typical polarizing films using such colorants. In these examples, the degree of polarization was determined according to the following procedure: Two pieces of a polarizing film are stacked in such a way that their directions of orientation are parallel to each other, and placed in the light path of a spectrophotometer to measure their light transmittance $(T_\parallel)$ at its maximum absorption wavelength in the visible region. Then, these pieces are stacked in such a way that their direction of orientation are perpendicular to each other, and their light transmittance $(T_\perp)$ at the same wavelength is measured. Thereafter, the degree of polarization (V) of the polarizing film is calculated according to the following equation.

$$V(\%) = \sqrt{\frac{T_\parallel - T_\perp}{T_\parallel - T_\perp}} \times 100$$

EXAMPLE 1

0.5 g of colorant No. 1 was heated in 100 g of nitrobenzene and then allowed to stand at 25° C. for several hours. Although the supernatant was slightly colored in yellow, most of the colorant precipitated.

On the other hand, 1 mg of the same colorant was added to liquid crystal E-8 (a biphenyl type liquid crystal commercially available from BDH Co.). The resulting mixture was heated to 90° C., stirred and then allowed to stand at 25° C. for several hours. As a result, the liquid crystal was scarcely colored.

Next, 1 g of the same colorant was intimately blended with 1 kg of pellets of a polyethylene terephthalate resin having an intrinsic viscosity of 0.7. The resulting blend was melt extruded at 280° C. to form a film. Using a roll stretching machine, this film was longitudinally stretched with a stretch ratio of 5 to obtain a film specimen having a thickness of 80μ. The dichroic ratio of the colorant at the maximum absorption wavelength of 415 nm was 8.7.

EXAMPLE 2

2 g of colorant No. 1-1 was added to and intimately blended with 1 kg of polyethylene terephthalate resin pellets. The resulting blend was melt extruded at 280° C. to form a film having a thickness of about 200μ. Using a tentering machine, this film was transversely stretched at 80° C. with a stretch ratio of 5 and then heat-treated at 150° C. for 1 minute. Thus, there was obtained a bright-yellow polarizing film whose degree of polarization at the maximum absorption wavelength of 415 nm was as high as 89%. When this polarizing film was allowed to stand at a temperature of 80° C. and a relative humidity of 90% for 500 hours, neither substantial change in color nor substantial reduction in the degree of polarization was noted. The shrinkage ratio of the film was not greater than 1% in both the longitudinal and the transverse direction, indicating its good dimensional stability.

EXAMPLE 3

31 g of purified 1,4-diaminoanthraquinone-2,3-dicarboxylic acid anhydride and 27 g of p-benzamidoaniline were added to 500 ml of N,N-dimethylformamide (DMF) and the resulting mixture was heated under reflux with stirring for 5 hours. After it was cooled to room temperature, the resulting precipitate was separated by filtration, washed with a small amount of DMF and then with methanol, and dried to obtain 41 g of colorant No. 2-1 in the form of greenish-blue needles (m.p. >360° C.). Its solubility in nitrobenzene was not greater than 0.05% and its dichroic ratio (at the maximum absorption wavelength of 685 nm) was 8.5 as measured in a polyethylene terephthalate film.

EXAMPLE 4

2 g of colorant No. 2-1 was added to and intimately blended with 1 kg of polyethylene terephthalate resin pellets. The resulting blend was melted at 280° C. and formed into a film. This film was transparent and had a bright greenish-blue color. Using a tentering machine, this colored film was transversely stretched at 80° C. with a stretch ratio of 5 and then heat-set at 180° C. for several seconds. Thus, there was obtained a polarizing film having a thickness of 70 μm. This polarizing film assumed a cyanic color (with a maximum absorption wavelength $\lambda_{max}$ of 685 nm) and its degree of polarization at $\lambda_{max}$ was 88%. When this polarizing film was allowed to stand at a temperature of 80° C. and a relative humidity of 90% for 500 hours, neither substantial change in color nor substantial reduction in the degree of polarization was noted.

EXAMPLE 5

Using p-phthalimidoaniline in place of the p-benzamidoaniline, the procedure of Example 3 was repeated to obtain colorant No. 2-2 in the form of fine greenish-blue needle-like crystals (m.p. >360° C.). Its solubility in o-dichlorrbenzene was not greater than 0.05% and its dichroic ratio (at the maximum absorption wavelength of 690 nm) was 8.9 as measured in a polyethylene terephthalate film. According to the procedure of Example 4, there was obtained a bright greenish-blue polarizing film having a degree of polarization of 90%.

EXAMPLE 6

Using 4-amino-4'-(2'',3''-naphthalenedicarboximido)-biphenyl in place of the p-benzamidoaniline, the procedure of Example 3 was repeated to obtain colorant No. 2-3 in the form of fine greenish-blue needle-like crystals (m.p. >360° C.). Its solubility in N,N-dimethylformamide was not greater than 0.05%, and it was practically insoluble in phenylcyclohexane type liquid crystal ZLI-1840 (a nematic liquid crystal commercially available from Merck Co.). Its dichroic ratio (at the maximum absorption wavelength of 685 nm) was 11.2 as measured in a polyethylene terephthalate film.

EXAMPLE 7

20 g of 1,4-diamino-3-cyanoanthraquinone-2-carbonyl-4'-aminoanilide was dissolved in 300 g of concentrated sulfuric acid and the resulting solution was stirred at 50°-60° C. for 3 hours. After it was poured into 2 liters of ice water, the resulting precipitate was separated by filtration, washed with water and then dried. This product was mixed with 1 liter of nitrobenzene and 7 g of anthraquinone-2,3-dicarboxylic acid anhydride and the resulting mixture was stirred at 205° C. for 5 hours. Thereafter, the mixture was filtered while being hot and the filtrate was cooled to room temperature. The resulting precipitate was separated by filtration, washed with methanol and then dried. Thus, there was obtained colorant No. 2-4 in the form of fine greenish-blue needle-like crystals (m.p. >360° C.). It was practically insoluble in water, an organic solvent (toluene) and a liquid crystal (E-8), and its dichroic ratio (at the maximum absorption wavelength of 710 nm) was 7.2 as measured in a polyethylene terephthalate film.

EXAMPLE 8

5 g of colorant No. 2-4 obtained in Example 7 was added to 1 liter of o-dichlorobenzene, and hydrogen sulfide gas was blown therethrough at 130° C. for 10 hours. After cooling, the resulting precipitate was separated by filtration, washed with methanol and then dried to obtain colorant No. 2-5 in the form of dark-blue crystals (m.p. >360° C.). It was practically insoluble in water, an organic solvent (toluene) and a liquid crystal (E-8) and, its dichroic ratio (at the maximum absorption wavelength of 740 nm) was 9.3 as measured in a polyethylene terephthalate film.

EXAMPLE 9

20 g of 5,8-di(N-methylamino)anthraquinone-2,3-dicarboxylic acid anhydride and 14 g of 4'-aminobiphenyl-4-carboxylic acid were added to 1 liter of nitrobenzene and the resulting mixture was stirred under reflux for 10 hours. After cooling, the resulting precipitate was separated by filtration and purified by recrystallization from N,N-dimethylformamide to obtain 24 g of colorant No. 2-6 in the form of dark-blue powder (m.p. >360° C.). It was practically insoluble in water, an organic solvent (toluene) and a liquid crystal (E-8), and its dichroic ratio (at the maximum absorption wavelength of 675 nm) was 11.2.

EXAMPLES 11 TO 173

Other colorants were evaluated in the same manner as in Example 1, except that these colorants were used in place of colorant No. 1-1. The results thus obtained are shown in Table 6. All of the colorants listed in Table 6 were practically insoluble in water, an organic solvent (toluene) and a liquid crystal (E-8).

Moreover, polarizing films were made in the same manner as in Example 2, except that other colorants were used in place of colorant No. 1-1. The degree of polarization of each polarizing film and the color of each polarizing film are also shown in Table 6. All of the polarizing films listed in Table 6 had excellent light resistance, moisture resistance and thermal resistance.

TABLE 6

| Example No. | Colorant No. | Dichroic ratio | Degree of polarization* | Color |
|---|---|---|---|---|
| 10 | 1-2 | 7.6 | 82 | Green |
| 11 | 1-3 | 9.3 | 85[1] | Blue |
| 12 | 1-4 | 7.6 | 78 | Blue |
| 13 | 1-5 | 7.2 | 75 | Red |
| 14 | 1-6 | 7.0 | 73 | Blue |
| 15 | 1-7 | 7.3 | 77 | Reddish orange |
| 16 | 1-8 | 7.4 | 73 | Blue |
| 17 | 1-9 | 7.5 | 78[1] | Blue |
| 18 | 1-10 | 7.2 | 75 | Green |
| 19 | 1-11 | 7.4 | 82[2] | Dark gray |
| 20 | 1-12 | 7.0 | 80[2] | Dark gray |
| 21 | 1-13 | 7.2 | 75 | Orange yellow |
| 22 | 1-14 | 7.0 | 70 | Red |
| 23 | 1-15 | 7.1 | 72 | Red |
| 24 | 1-16 | 7.0 | 72 | Red |
| 25 | 1-17 | 7.9 | 80 | Blue |
| 26 | 1-18 | 7.3 | 74 | Purple |
| 27 | 1-19 | 7.8 | 82[2] | Purple |

TABLE 6-continued

| Example No. | Colorant No. | Dichroic ratio | Degree of polarization* | Color |
|---|---|---|---|---|
| 28 | 1-20 | 7.0 | 70 | Red |
| 29 | 1-21 | 7.6 | 75 | Reddish orange |
| 30 | 1-22 | 7.1 | 74 | Orange |
| 31 | 1-23 | 7.2 | 73 | Red |
| 32 | 1-24 | 7.6 | 80[2] | Purple |
| 33 | 1-25 | 7.3 | 71 | Blue |
| 34 | 1-26 | 7.2 | 72 | Dark blue |
| 35 | 1-27 | 7.6 | 75 | Blue |
| 36 | 1-28 | 7.5 | 78 | Blue |
| 37 | 1-29 | 7.3 | 76 | Yellow |
| 38 | 1-30 | 8.1 | 82[1] | Yellow |
| 39 | 1-31 | 7.7 | 80 | Yellow |
| 40 | 1-32 | 7.2 | 75 | Yellow |
| 41 | 1-33 | 7.0 | 70 | Blue |
| 42 | 1-34 | 7.6 | 79 | Blue |
| 43 | 1-35 | 7.0 | 71 | Orange |
| 44 | 1-36 | 7.0 | 73 | Blue |
| 45 | 1-37 | 7.0 | 70 | Blue |
| 46 | 1-38 | 7.1 | 72 | Blue |
| 47 | 1-39 | 7.1 | 71 | Blue |
| 48 | 1-40 | 7.0 | 70[3] | Blue |
| 49 | 1-41 | 7.6 | 78 | Yellow |
| 50 | 1-42 | 7.7 | 80 | Yellow |
| 51 | 1-43 | 7.6 | 80 | Yellow |
| 52 | 1-44 | 7.1 | 72 | Yellow |
| 53 | 1-45 | 7.6 | 75 | Yellow |
| 54 | 1-46 | 8.1 | 83 | Orange |
| 55 | 1-47 | 8.0 | 72[3] | Orange |
| 56 | 1-48 | 8.0 | 78 | Red |
| 57 | 2-7 | 7.1 | 73[3] | Greenish blue |
| 58 | 2-8 | 7.0 | 69 | Greenish blue |
| 59 | 2-9 | 7.8 | 80 | Greenish blue |
| 60 | 2-10 | 7.5 | 78 | Greenish blue |
| 61 | 2-11 | 7.7 | 80 | Greenish blue |
| 62 | 2-12 | 8.3 | 85[1] | Greenish blue |
| 63 | 2-13 | 7.6 | 80 | Blue |
| 64 | 2-14 | 10.7 | 88 | Green |
| 65 | 2-15 | 9.3 | 85 | Greenish blue |
| 66 | 2-16 | 7.6 | 82[2] | Greenish blue |
| 67 | 2-17 | 12.0 | 90 | Greenish blue |
| 68 | 2-18 | 8.0 | 81 | Greenish blue |
| 69 | 2-19 | 13.0 | 93 | Blue |
| 70 | 2-20 | 7.5 | 76[3] | Blue |
| 71 | 2-21 | 7.3 | 79[1] | Blue |
| 72 | 2-22 | 11.2 | 89 | Blue |
| 73 | 2-23 | 8.3 | 82 | Greenish blue |
| 74 | 2-24 | 7.7 | 80 | Greenish blue |
| 75 | 2-25 | 14.2 | 94 | Blue |
| 76 | 2-26 | 15.7 | 95 | Greenish blue |
| 77 | 2-27 | 18.6 | 97 | Blue |
| 78 | 2-28 | 20.7 | 98 | Greenish blue |
| 79 | 2-29 | 18.6 | 97[2] | Greenish blue |
| 80 | 2-30 | 11.7 | 90 | Blue |
| 81 | 2-31 | 9.3 | 85 | Brown |
| 82 | 2-32 | 7.1 | 73 | Greenish blue |
| 83 | 2-33 | 7.5 | 78[1] | Greenish blue |
| 84 | 2-34 | 13.8 | 93 | Brown |
| 85 | 2-35 | 10.7 | 88 | Brown |
| 86 | 2-36 | 11.5 | 90 | Blue |
| 87 | 2-37 | 7.8 | 78 | Blue |
| 88 | 2-38 | 7.2 | 70 | Blue |
| 89 | 2-39 | 13.0 | 92 | Greenish blue |
| 90 | 2-40 | 10.8 | 90 | Blue |
| 91 | 2-41 | 8.1 | 82 | Blue |
| 92 | 2-42 | 18.3 | 97 | Blue |
| 93 | 2-43 | 15.6 | 95 | Blue |
| 94 | 2-44 | 17.0 | 97[2] | Greenish blue |
| 95 | 2-45 | 8.1 | 82 | Greenish blue |
| 96 | 2-46 | 10.0 | 87[2] | Greenish blue |
| 97 | 2-47 | 19.1 | 98 | Greenish blue |
| 98 | 2-48 | 15.6 | 95 | Greenish blue |
| 99 | 2-49 | 17.2 | 96 | Greenish blue |
| 100 | 2-50 | 18.6 | 98[1] | Greenish blue |
| 101 | 2-51 | 18.0 | 97 | Greenish blue |
| 102 | 2-52 | 20.1 | 98[2] | Greenish blue |
| 103 | 2-53 | 19.1 | 98 | Greenish blue |
| 104 | 2-54 | 19.2 | 97 | Blue |
| 105 | 2-55 | 16.0 | 95 | Brown |
| 106 | 2-56 | 9.0 | 84 | Blue |
| 107 | 2-57 | 10.1 | 87 | Blue |
| 108 | 2-58 | 11.7 | 90 | Blue |
| 109 | 2-59 | 20.5 | 98 | Greenish blue |
| 110 | 2-60 | 14.7 | 89[3] | Greenish blue |
| 111 | 3-1 | 10.7 | 88 | Reddish orange |
| 112 | 3-2 | 18.6 | 97 | Reddish orange |
| 113 | 3-3 | 9.3 | 85[3] | Reddish orange |
| 114 | 3-4 | 7.0 | 73 | Reddish orange |
| 115 | 3-5 | 7.5 | 77 | Reddish orange |
| 116 | 3-6 | 12.7 | 92 | Reddish orange |
| 117 | 3-7 | 18.5 | 98[2] | Reddish orange |
| 118 | 3-8 | 18.5 | 97 | Reddish orange |
| 119 | 3-9 | 15.0 | 95[2] | Reddish orange |
| 120 | 3-10 | 7.9 | 83[2] | Reddish orange |
| 121 | 3-11 | 10.5 | 88 | Reddish orange |
| 122 | 3-12 | 11.1 | 89 | Reddish orange |
| 123 | 4-1 | 12.3 | 91 | Red |
| 124 | 4-2 | 7.3 | 76[3] | Red |
| 125 | 4-3 | 7.3 | 74 | Red |
| 126 | 4-4 | 8.6 | 83 | Red |
| 127 | 4-5 | 11.2 | 91[2] | Red |
| 128 | 4-6 | 9.4 | 85 | Orange |
| 129 | 4-7 | 7.6 | 79 | Red |
| 130 | 4-8 | 14.7 | 94 | Red |
| 131 | 4-9 | 11.7 | 90 | Bluish purple |
| 132 | 4-10 | 7.0 | 71 | Blue |
| 133 | 4-11 | 10.0 | 87 | Blue |
| 134 | 4-12 | 11.9 | 91 | Blue |
| 135 | 4-13 | 17.5 | 96 | Blue |
| 136 | 4-14 | 12.2 | 91 | Orange |
| 137 | 4-15 | 12.0 | 90[2] | Orange |
| 138 | 4-16 | 9.3 | 85 | Orange |
| 139 | 4-17 | 13.4 | 93 | Red |
| 140 | 4-18 | 9.4 | 85 | Blue |
| 141 | 4-19 | 10.5 | 87 | Red |
| 142 | 4-20 | 8.3 | 82[1] | Red |
| 143 | 4-21 | 9.3 | 85 | Green |
| 144 | 4-22 | 7.5 | 73 | Green |
| 145 | 4-23 | 15.0 | 94 | Blue |
| 146 | 4-24 | 12.1 | 91 | Bluish green |
| 147 | 4-25 | 10.7 | 90 | Purple |
| 148 | 4-26 | 11.3 | 91 | Purple |
| 149 | 4-27 | 11.1 | 90 | Red |
| 150 | 4-28 | 8.5 | 82 | Orange |
| 151 | 4-29 | 10.9 | 89 | Blue |
| 152 | 4-30 | 12.1 | 91 | Blue |
| 153 | 5-1 | 17.0 | 96 | Orange |
| 154 | 5-2 | 14.7 | 94 | Orange |
| 155 | 5-3 | 18.3 | 97 | Orange |
| 156 | 5-4 | 11.2 | 79[3] | Orange |
| 157 | 5-5 | 8.4 | 82 | Orange |
| 158 | 5-6 | 18.0 | 97[2] | Orange |
| 159 | 5-7 | 18.2 | 97 | Orange |
| 160 | 5-8 | 15.4 | 95 | Orange |
| 161 | 5-9 | 17.0 | 96 | Orange |
| 162 | 5-10 | 13.0 | 92[1] | Orange |
| 163 | 5-11 | 18.0 | 97[1] | Orange |
| 164 | 5-12 | 18.2 | 97 | Orange |
| 165 | 5-13 | 17.3 | 96 | Orange |
| 166 | 5-14 | 13.3 | 92 | Orange |
| 167 | 5-15 | 11.7 | 90 | Orange |
| 168 | 5-16 | 18.9 | 98 | Orange |
| 169 | 5-17 | 12.0 | 90 | Orange |
| 170 | 5-18 | 10.7 | 88 | Orange |
| 171 | 5-19 | 8.3 | 81[3] | Orange |
| 172 | 5-20 | 11.7 | 90 | Orange |
| 173 | 5-21 | 9.3 | 85 | Orange |

(Note)
*The degree of polarization of a polarizing film whose base polymer is as follows:
No mark: Polyethylene terephthalate.
1): A mixture of 80% by weighty of polyethylene terephthalate and 20% by weight of polybutylene terephthalate.
2): A mixture of 80% by weight of polyethylene terephthalate and 20% by weight of polythylene naphthalate.
3): Nylon 6.

COMPARATIVE EXAMPLE 1

A blue polarizing film was made in the same manner as in Example 2, except that a dichroic dye for use with liquid crystals (having the structural formula A given below and a dichroic ratio of 8.0 as measured in polyethylene terephthalate) was used in place of colorant No. 1-1.

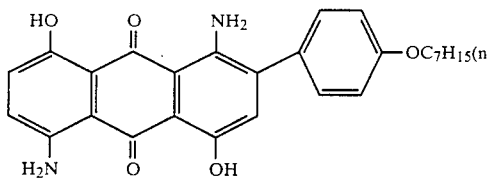

Its degree of polarization at the maximum absorption wavelength of 640 nm was as low as 52%. However, when a similar film was made with the omission of the heat treatment step following the stretching step, it exhibited a degree of polarization of 78% at the same wavelength. This clearly indicates that the heat treatment step caused a marked reduction in the degree of polarization. On the other hand, the shrinkage ratio of the heat-treated film was not greater than 1% in both the longitudinal and the transverse direction, whereas the film made without heat treatment exhibited high shrinkage ratios of 8% in the longitudinal direction and 15% in the transverse direction and hence was lacking in dimensional stability.

The solubility of dye A in liquid crystal E-8 (a nematic liquid crystal commercially available from BDH Co.) was about 2.0% by weight.

COMPARATIVE EXAMPLE 2

A reddish-orange polarizing film was made in the same manner as in Example 2, except that a dichroic dye for use with liquid crystals (having the structural formula B given below and a dichroic ratio of 8.0 as measured in polyethylene terephthalate) was used in place of colorant No. 1-1.

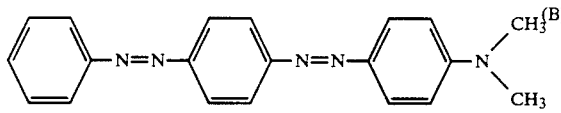

Its degree of polarization at the maximum absorption wavelength of 495 nm was as low as 47%. The degree of polarization of a similar film made without heat treatment was as high as 80%, but its shrinkage ratio was 6% in the longitudinal direction and 12% in the transverse direction, indicating a lack of dimensional stability.

The solubilities of dye B in liquid crystal E-8 and nitrobenzene were about 1.0% by weight and about 0.6% by weight, respectively.

COMPARATIVE EXAMPLE 3

Polarizing films were made in the same manner as in Example 2, except that each of the colorants of the structural formulas C and D given below (having dichroic ratios of 6.7 and 8.0, respectively, as measured in polyethylene terephthalate) was used in place of colorant No. 1-1.

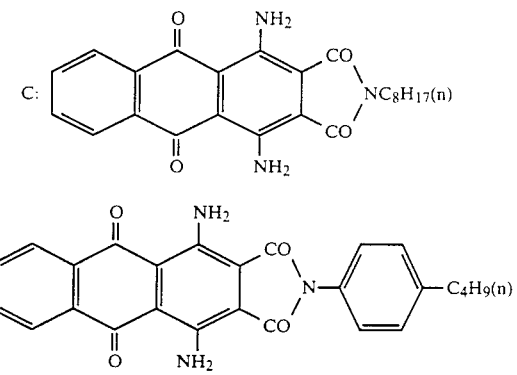

These polarizing films, together with the polarizing films of the above-described Examples 4 and 77, were heated in an oven at 120° C. for 1000 hours. The degree of polarization of each polarizing film before and after the heating test was as shown in Table 7. Thus, the polarizing films using the colorants of Examples 4 and 77 exhibited stabler polarizing performance than those using reference colorants C and D.

The solubilities of colorants C and D in liquid crystal E-8 were 0.7% by weight and 1.0% by weight, respectively.

TABLE 7

| Colorant | Degree of polarization (1) before heating test | Degree of polarization (2) after heating test | % reduction in degree of polarization* |
|---|---|---|---|
| Example 4 | 88% | 87% | 1.1% |
| Example 77 | 97% | 96% | 1.0% |
| Comparative Example C | 71% | 56% | 21.1% |
| Comparative Example D | 80% | 63% | 21.3% |

*[(1) − (2)]/(1) × 100(%)

We claim:
1. A polarizing film comprising a hydrophobic polymer containing a dichroic organic colorant in an oriented state, wherein the dichroic organic colorant, which has the formula:

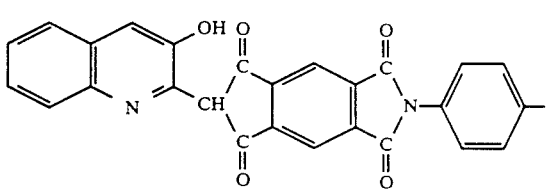

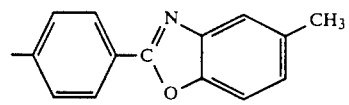

has a solubility in water, organic solvents and liquid crystals of not greater than 0.05 percent by weight at about 25° C., and the dichroic ratio of the colorant is not less than 7 when it is measured with the film obtained by blending the colorant intimately with polyethylene terephthalate, melting the resulting blend and forming it into a film.

2. The polarizing film as claimed in claim 1 wherein the hydrophobic polymer contains not less than 80 percent by weight of at least one polymer selected from the group consisting of polyethylene terephthalate, polyethylene naphthalate and polybutylene terephthalate.

3. A polarizing film comprising a hydrophobic polymer containing a dichroic organic colorant in an oriented state which is characterized in that the dichroic organic colorant, which is a compound of the formula:

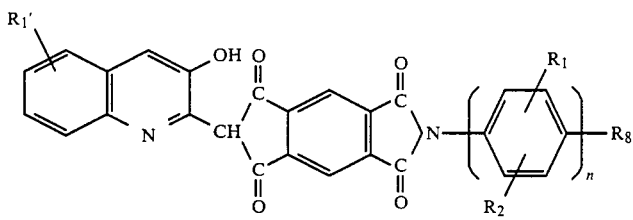

where $R_1$, $R_2$ and $R'_1$ independently are a member selected from the group consisting of a hydrogen atom, a halogen atom, a methyl group and a methoxy group; n is a whole number equal to 1, 2 or 3; $R_8$ is:

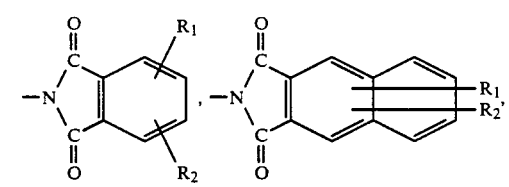

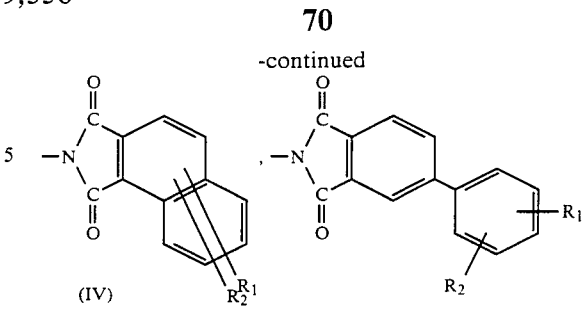

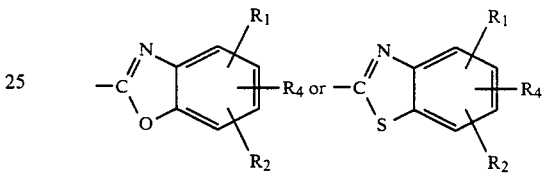

in which $R_4$ is a member selected from the group consisting of a phenyl radical, a biphenyl radical and a naphthalene radical that can be substituted by at least one member selected from the group consisting of $R_1$, $R_2$, —COOH and COOCH$_3$, has a solubility in water, organic solvent and liquid crystals of not greater than 0.05 percent by weight at about 25° C., and the dichroic ratio of the colorant is not less than 7 when it is measured with the film obtained by blending the colorant intimately with polyethylene terephthalate, melting the resulting blend and forming it into a film.

4. A polarizing film as claimed in claim 3 wherein the hydrophobic polymer contains not less than 80% by weight of at least one polymer selected from the group consisting of polyethylene terephthalate, polyethylene naphthalate and polybutylene terephthalate.

* * * * *